United States Patent
Seigneur et al.

(10) Patent No.: US 10,378,611 B2
(45) Date of Patent: Aug. 13, 2019

(54) RIGID CHAIN LINK AND RIGID CHAIN EQUIPPED WITH SUCH A LINK

(71) Applicant: SERAPID—FRANCE, Londinières (FR)

(72) Inventors: Ivan Seigneur, Londinières (FR); Philippe Novick, Londinières (FR)

(73) Assignee: SERAPID—FRANCE, Londinières (FR)

( * ) Notice: Subject to any disclaimer, the term of this patent is extended or adjusted under 35 U.S.C. 154(b) by 0 days.

(21) Appl. No.: 15/776,320

(22) PCT Filed: Nov. 15, 2016

(86) PCT No.: PCT/FR2016/052953
§ 371 (c)(1),
(2) Date: May 15, 2018

(87) PCT Pub. No.: WO2017/085389
PCT Pub. Date: May 26, 2017

(65) Prior Publication Data
US 2018/0372185 A1     Dec. 27, 2018

(30) Foreign Application Priority Data
Nov. 16, 2015  (FR) ..................... 15 60948

(51) Int. Cl.
*F16G 13/20*    (2006.01)
(52) U.S. Cl.
CPC .................... *F16G 13/20* (2013.01)
(58) Field of Classification Search
CPC .......... F16G 13/20; F16G 13/00; F16G 13/06; F16G 13/18

USPC ............................................................. 72/78
See application file for complete search history.

(56) References Cited

U.S. PATENT DOCUMENTS

| 2,219,125 A | 10/1940 | Bremer |
| 3,831,455 A | 8/1974 | Patrignani |
| 5,156,574 A * | 10/1992 | Gai ........................ E05F 11/06 474/155 |
| 6,224,037 B1 | 5/2001 | Novick |

(Continued)

FOREIGN PATENT DOCUMENTS

| AU | 2010212303 A1 | 4/2011 |
| BE | 642350 A | 1/1964 |

(Continued)

OTHER PUBLICATIONS

International Search Report and Written Opinion of the International Searching Authority, dated Feb. 20, 2017, in connection with International Application No. PCT/FR2016/052953. (8 pages).

(Continued)

*Primary Examiner* — David B Jones
(74) *Attorney, Agent, or Firm* — McCarter & English, LLP

(57) ABSTRACT

Link for a rigid chain, comprising at least one flange, of rectangular overall shape, with a substantially constant thickness perpendicularly to its main plane. The flange comprises a first part and a second part. Each of the parts comprises a heel designed to bear against a corresponding heel of a similar flange of an adjacent link of the rigid chain, and a base designed to form a bearing about a rotary pin with respect to said adjacent link. The heel and the base each extend on either side of the main plane and parallel to said main plane.

17 Claims, 4 Drawing Sheets

(56) References Cited

U.S. PATENT DOCUMENTS 8,336,286 B2 * 12/2012 Veltrop .................. F16G 13/20
                                                                                 222/113
8,500,101 B2 *  8/2013 Yaoi ...................... F16G 13/20
                                                                                 254/358

FOREIGN PATENT DOCUMENTS

| FR | 2134196 A1 | 12/1972 |
| FR | 2345626 A1 | 10/1977 |
| FR | 2573832 A1 | 5/1986 |
| FR | 2786476 A1 | 6/2000 |
| GB | 1534726 A | 12/1978 |

OTHER PUBLICATIONS

English Translation of the International Search Report dated Feb. 20, 2017, in connection with International Application No. PCT/FR2016/052953. (2 pages).

* cited by examiner

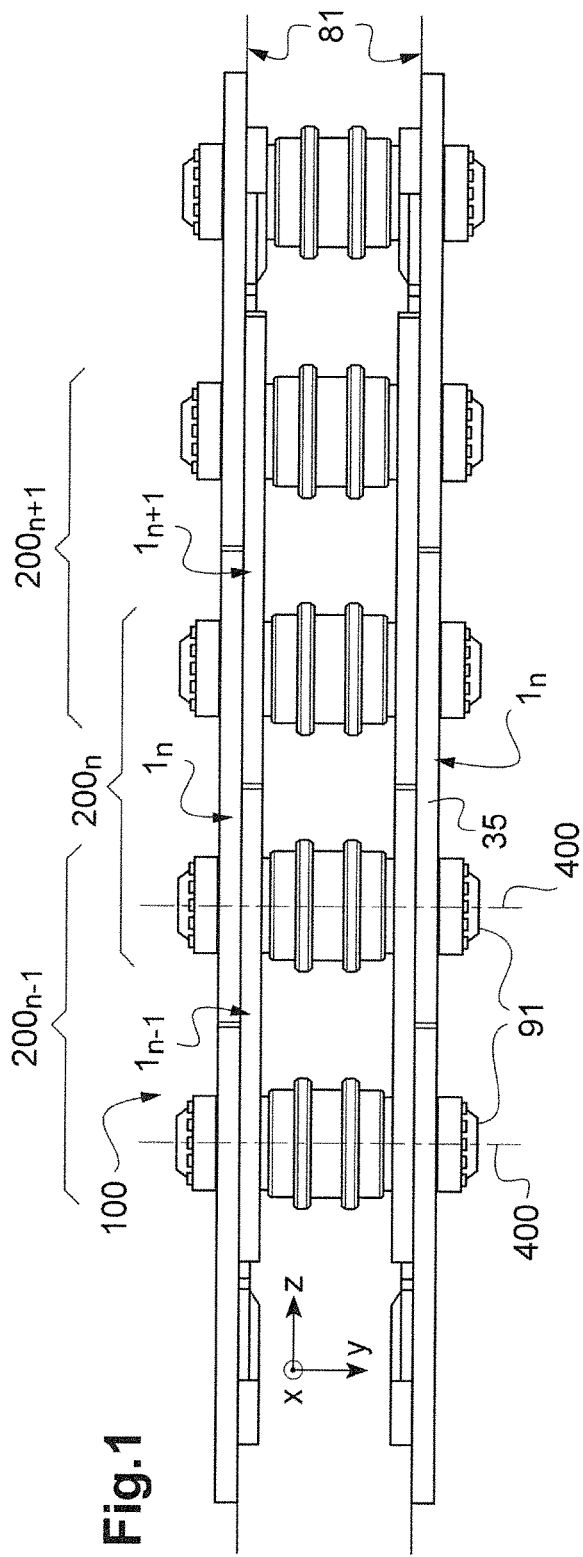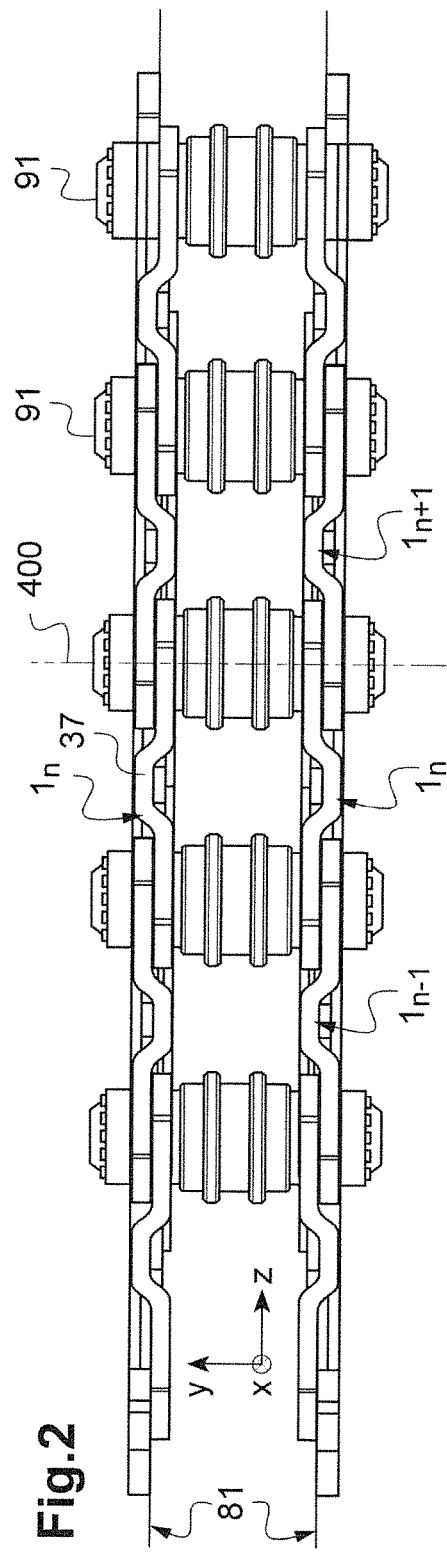

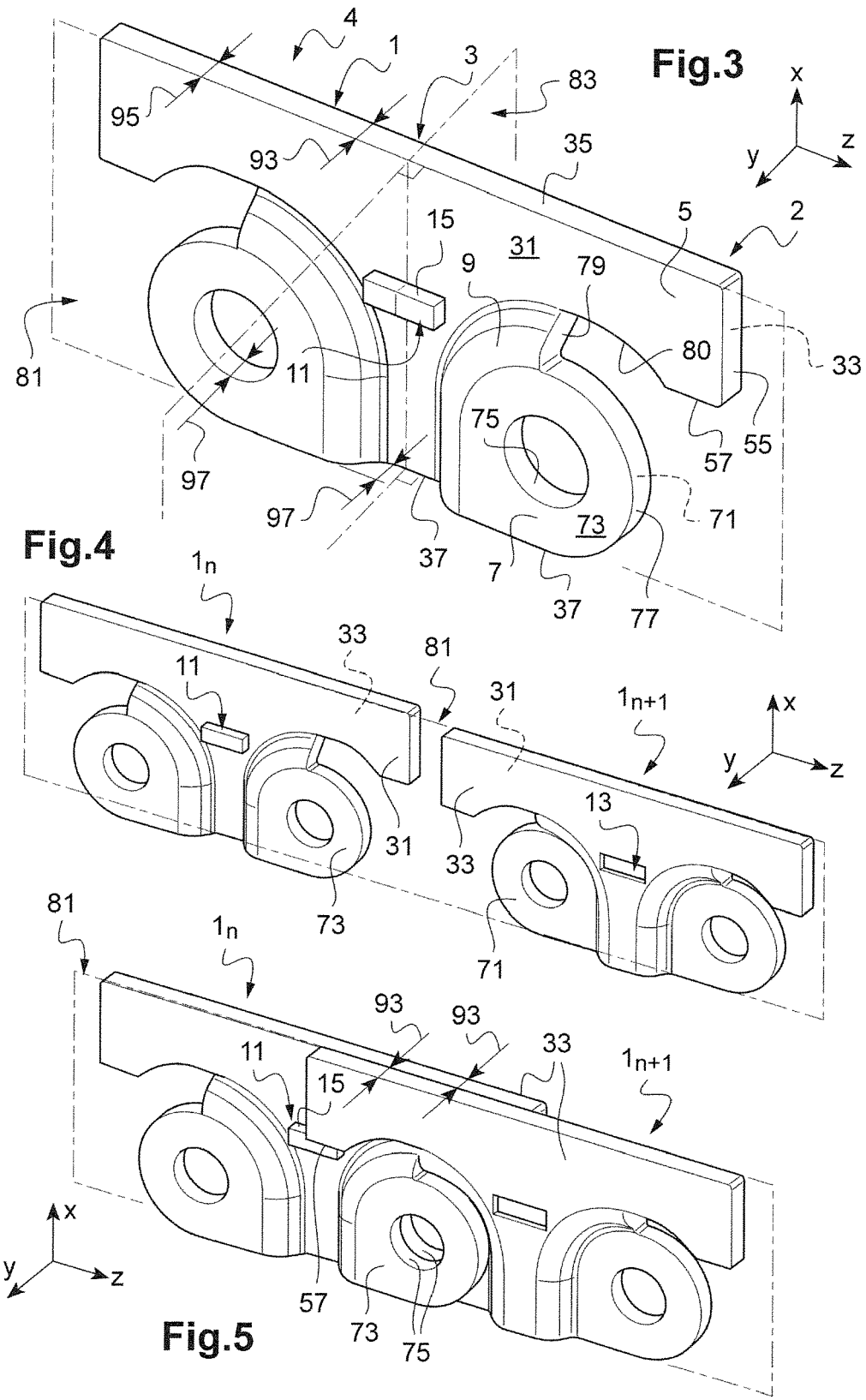

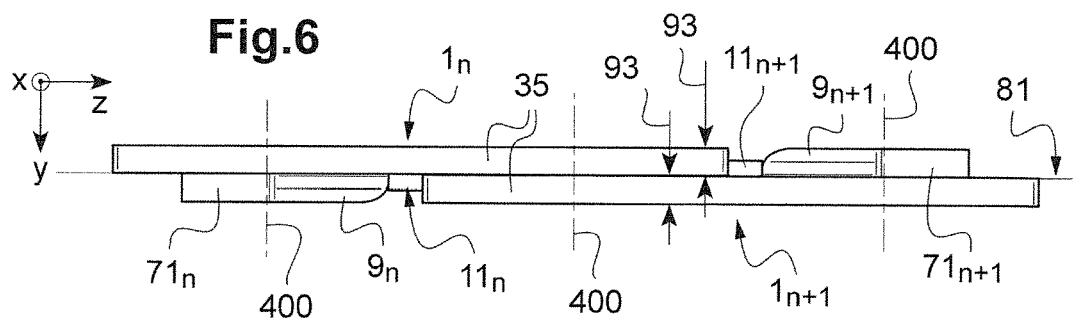
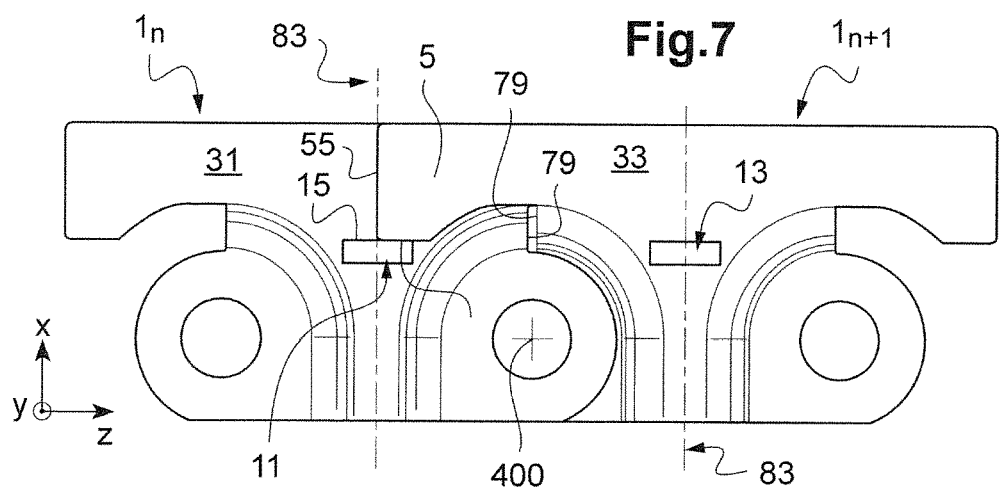
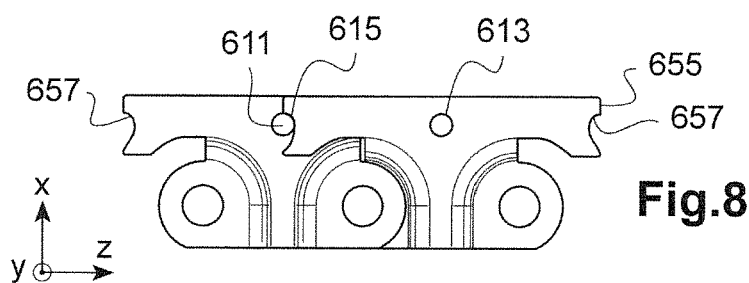
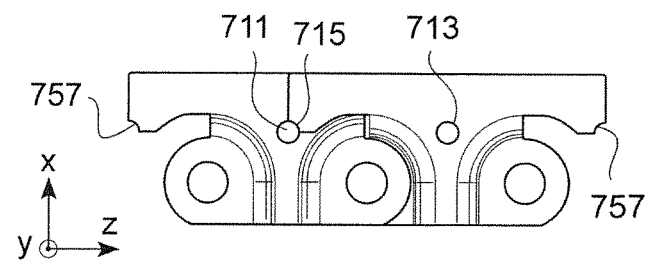

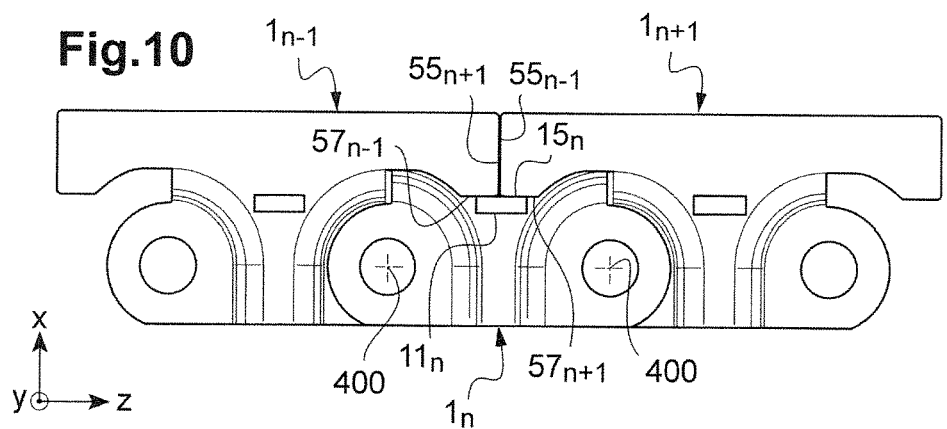
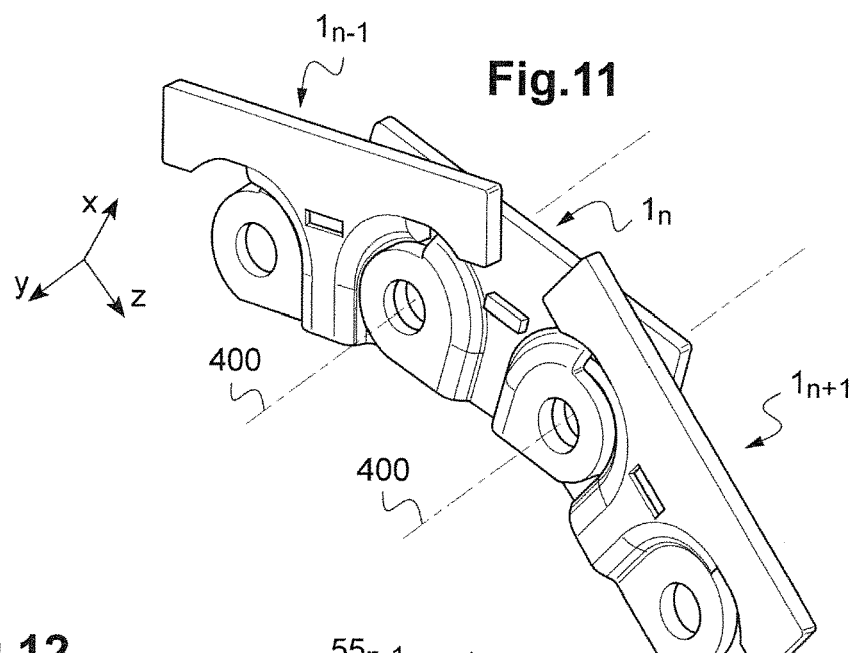
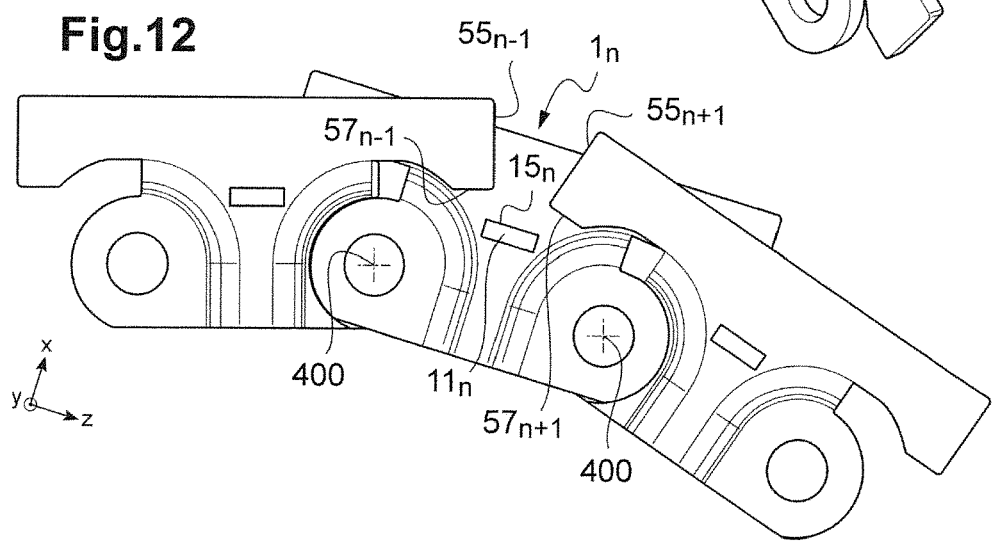

RIGID CHAIN LINK AND RIGID CHAIN EQUIPPED WITH SUCH A LINK

RELATED APPLICATIONS

This application is a U.S. National Phase Application under 35 U.S.C. 371 of International Application No. PCT/FR2016/052953 filed on Nov. 15, 2016, which was published on May 26, 2017 under International Publication Number WO 2017/085389 A1, and which claims the benefit of French Patent application Ser. No. 15/60,948 filed on Nov. 16, 2015. The disclosures of these applications are incorporated herein by reference in their entireties.

BACKGROUND

The invention concerns chains for moving loads, termed rigid chains, and more particularly the links used to form such chains.

Rigid chains, also known as articulated rods, can go from a folded state in which they occupy a small overall size to a deployed state in the form of a rectilinear and rigid structure capable of pulling, supporting and pushing heavy loads.

Such chains are formed by a series of analogous links, each link comprising two lateral flanges, sometimes termed flanks, mounted in rotation from one link to another by means of rotation pins. The links are such that the chain can go from a rectilinear state to a curved state or a state rolled up on itself and vice versa. The chain can be curved in a single plane and in a single direction. Curvatures in other directions and twists are prevented, in particular by an appropriate configuration and an appropriate adjustment of the parts constituting the chain.

In FR 2 134 196, each link flange is produced by assembling two different mechanical parts. A flat first part of complex shape transmits compression forces from one link to another when the chain is rectilinear. A flat second part of oblong shape connects two adjacent rotation pins and operates essentially in traction. The two parts are assembled against one another by crimping them. A manufacturing defect, for example a flatness defect, sometimes occurs in a part. A defect of this kind may be tolerable at the scale of the link. In other words, the operation of the chain is not compromised if a link of the chain feature a minimal defect. Now these parts are generally mass produced, in batches. If a defect, even a minimal defect, is reproduced on each of the parts of a batch used to form a chain, these defects are cumulative over the length of the chain to the point of preventing its correct operation, in particular over great lengths. Moreover, in the case of a bending force oriented substantially perpendicularly to the flanges, the crimping and/or the flatness of the flanges may be degraded to the point of bending of one of the flanks and immobilization of the chain.

FR 2 573 832 describes an embodiment in which a one-piece part is used to form each flange of the chain. Such parts are also subject to bending in the event of a bending force perpendicular to the flanges, which limits the conditions of use of the chain. Moreover, the length of the chain remains limited because of the risk of failures caused by manufacturing defects in a batch of parts.

The configuration described in FR 2 345 626 is simplified: the flange of the chain is constituted of only one type of part. For each flange of the chain, two rows of parts are superposed in a quincunx arrangement. The chain is also fragile in the event of bending forces oriented perpendicularly to the flanges.

The Applicant has developed rigid chains the flanges of which are produced by assembling identical flat parts. A configuration of this kind is described in FR 2 786 476. The manufacture and the assembly of the parts are facilitated. In this configuration, the quincunx superposition of two identical parts for each flange is still necessary. This superposition is difficult to preserve over time, in particular in the event of bending forces perpendicular to the plane of the flanges. Play and relative movements that are not wanted occur between the parts of a flank of the chain. Such play can lead to premature wear, or even to bending of the chain.

The invention improves on the situation.

SUMMARY

The Applicant proposes a rigid chain link comprising at least one flange, of rectangular general shape, of substantially constant thickness perpendicular to its main plane. The flange comprises a first part and a second part. Each of the parts comprises:
- a heel adapted to come to bear against a corresponding heel of an analogous flange of an adjacent link of the rigid chain, and
- a base adapted to form a bearing around a rotation axis relative to said adjacent link.

The heel and the base lie on respective opposite sides of the main plane and are parallel to said main plane.

A rigid chain link of this kind makes it possible to ensure the transmission of forces in the main direction of the chain whilst having good resistance bending. The shape of the flanges leads to interpenetration of the flanges with one another rather than simple superposition. By being nested, the flanges have an enhanced resistance to bending and an enhanced resistance to buckling of the chain, whatever the direction of the applied bending forces. Additional reinforcing parts are superfluous. The manufacture of the flanges is simple and of relatively low cost. Upon assembly into a rigid chain, it suffices to juxtapose identical flanges with their orientation reversed from one link to another. The orientation of each flange in the assembly is imposed by its shape. An assembly error is impossible. The Applicant has also found that by reversing the orientation of the flange one time in two, each manufacturing defect in a flange, for example in respect of flatness, is compensated by the defect of the next flange oriented in the opposite direction. In other words, if all the flanges of a batch feature the same defect, then a pair of links the flanges of which are oriented in opposite directions relative to one another can then feature zero defects. The defect of one flange compensates the defect of the other one. Instead of accumulating over the length of the chain, the effects of the manufacturing defects of each flange compensate one another. The length of the chain is no longer limited by such manufacturing defects.

The rigid chain link may have the following optional features, singly or in combination with one another:
  the heel of the first part and the heel of the second part both lie on one side of the main plane whilst the base of the first part and the base of the second part both lie on the opposite side of the main plane. This makes it possible to form links one after the other by disposing the flanges successively in one direction and in the other. The effects of any manufacturing defects in a batch of flanges are therefore compensated from one link to the other.

the base of the first part and the base of the second part are substantially symmetrical with respect to one another relative to a transverse plane perpendicular to the main plane. This facilitates the assembly of a link with its neighbor by disposition of the flanges successively in one direction and in the other, whilst reducing the operating play.

the link bears surfaces substantially arranged with corresponding shapes to cooperate by abutment with corresponding surfaces of analogous links of the rigid chain. The heel of the first part and the heel of the second part being substantially symmetrical with respect to one another relative to a transverse plane perpendicular to the main plane, apart from the shape of the surfaces adapted to cooperate by abutting. This facilitates the assembly of a link with its neighbor by disposition of the flanges successively in one direction and in the other, whilst reducing the operating play. Moreover, the bearing zones in compression between two links are situated substantially equidistantly from the rotation axes of said links, which improves the distribution of stresses and the resistance to bending.

the flange is formed in one piece. This makes it possible to limit the risks of fragility of a flange relative to a connection such as a crimped connection.

the heel and the base of the first part and/or the second part each have a face substantially coplanar with the main plane. This makes it possible to limit the play and the relative movements between the flanges of two adjacent links.

the flange further comprises a body, the body connecting the heels and the bases to one another. This makes it possible to enhance the robustness of a flange.

the first part and the second part of the flange each comprise a connecting portion connecting the heel and the base to one another, the connecting portions being formed by bending. This facilitates the manufacture of the flanges. The connecting portion may for example be formed simultaneously with cutting out the flange in a sheet metal blank.

a substantially circular hole is formed in the base. A base is formed between the heel and the base, said space being open at one longitudinal end of the part and extending longitudinally toward the opposite longitudinal end beyond the center of the circular hole. A space of this kind allows deep interpenetration of one flange in the other. A tolerance in the manufacture of the flange is permitted without a deformed portion coming to impede the interpenetration.

each heel bears a front surface oriented so as to come to bear against a corresponding surface of said adjacent link. A front surface of this kind makes it possible to ensure transmission of forces substantially aligned with the main direction of the chain in the rectilinear state and limits the appearance of bending forces on the flange.

the flange bears lateral surfaces oriented so as to limit the relative rotation of the link and said adjacent link by abutting against corresponding surfaces of said adjacent link. The correct alignment of the flanges relative to one another is well adjusted in the rectilinear portion of the chain.

the flange further comprises a nipple on the same side of the main plane as the bases, the heels featuring one of said lateral surfaces, the nipple bearing another of said lateral surfaces, so that the lateral surface of the heel comes to abut against the corresponding lateral surface of the nipple of said adjacent link and the surface of the nipple comes to abut against the corresponding lateral surface of the heel of said adjacent link. The correct adjustment of the flanges in rotation relative to one another is well controlled without the overall thickness of the flanges being increased.

In accordance with a second aspect of the invention, the Applicant also proposes a rigid chain formed by assembling links as defined hereinabove one after the other so that the orientation of the flange of one link is reversed in a thickness direction relative to that of the respective flange of the preceding link and the following link. Each link is mounted in rotation with the preceding link and with the following link respectively by means of rods threaded into the bases.

The Applicant also proposes a method of manufacturing a link as defined above comprising the following steps:
  a) cropping a flange blank in sheet metal, and
  b) offsetting the bases relative to the heels in the direction of the thickness and forming connecting portions by bending.

BRIEF DESCRIPTION OF THE DRAWINGS

Other features, details and advantages of the invention will become apparent on reading the following detailed description and from the appended drawings, in which:

FIG. 1 shows a view of a portion of a chain according to the invention;

FIG. 2 shows a view of the portion from FIG. 1 from the opposite side;

FIG. 3 shows a perspective view of a flange of the chain from FIG. 1;

FIG. 4 shows a perspective view of two identical flanges before assembly in a rigid chain according to the invention;

FIG. 5 shows the partial assembly of the two flanges from FIG. 4;

FIG. 6 shows a view from above of the assembly from FIG. 5;

FIG. 7 shows a front view of the assembly from FIG. 5;

FIGS. 8 and 9 show views similar to that of FIG. 7 of flanges according to two other embodiments of the invention;

FIG. 10 shows a front view of the assembly of three identical flanges according to the invention;

FIG. 11 shows a perspective view of an assembly of three identical flanges according to the invention in a curved state of the chain; and FIG. 12 shows a front view of the assembly from FIG. 11.

The drawings and the following description cover for the most part elements of a certain character. They may therefore serve not only to explain the present invention better but also to contribute to the definition thereof, if necessary. It is noted that elements such as the geometry of complex flanges are difficult to define completely other than by means of a drawing.

DETAILED DESCRIPTION

In FIGS. 1 and 2 a chain is referenced 100. Links 200 of the chain 100 are distinguished from one another by a subscript from 1 to n from a tail link to a head link. Accordingly, the subscript n denotes a link $200_n$ whilst the subscript n+1 denotes the next link $200_{n+1}$ on the head side of the chain 100. Each flange, or flank, for a link 200 of the chain 100 is referenced 1.

Three mutually perpendicular directions are symbolized by a three-dimensional system of axes:

the direction x corresponds to the transverse direction, perpendicular to the plane of FIGS. 1 and 2;

the direction y corresponds to the direction of the thickness of the flanges 1 of the chain 100, to the direction of the rotation axes 400 of the links 200 and to the top-to-bottom direction in FIG. 1;

the direction z corresponds to the longitudinal direction, to the principal direction of the chain 100 in its rectilinear configuration and to the left-to-right direction in FIG. 1.

Each link $200_n$ comprises one or more flanges $1_n$. In the example from FIGS. 1 and 2, each link $200_n$ comprises a pair of flanges $1_n$, each of the flanges $1_n$ belonging to a row forming one of the two flanks of the chain 100. The two flanges $1_n$ of a link $200_n$ are mounted so as to be free to rotate about two common rods 91 extending along the rotation axes 400. The flanges $1_n$ are fixed in translation around the rods 91, here for example by means of circlips. The chain 100 has a section perpendicular to its longitudinal direction z of generally square shape. Alternatively, the chain 100 comprises a single row or more than two rows of flanges. In these cases, each link $200_n$ respectively comprises either one or more than two flanges $1_n$.

Each row of the chain 100 comprises a succession of flanges 1 in a quincunx arrangement. A flange $1_n$ of a link $200_n$ is simultaneously:

mounted to rotate about a first rod 91 shared with the part $1_{n-1}$ of the immediately preceding tail link $200_{n-1}$;

aligned longitudinally with the part $1_{n-2}$ of the preceding tail link $200_{n-2}$;

mounted to rotate about a second rod 91 shared with the part $1_{n+1}$ of the immediately following head link $200_{n-1}$;

aligned longitudinally with the part $1_{n+2}$ of the following head link $200_{n+2}$.

Here the parts 1 of the chain 100 are identical. Each part 1 is of rectangular general shape and has a length, a width and a thickness. The orientation of each part 1 in the chain 100 is such that:

the width of the part 1 is oriented in the transverse direction x of the chain 100, the thickness of each part 1 is oriented in the thickness direction y, and the length is oriented in the longitudinal direction z of the chain 100.

In the subsequent figures, the three-dimensional system of axes represents the orientation relative to the chain 100 of the part 1 or of the part $1_n$ if a plurality of parts 1 are represented.

Reference is now made to FIG. 3 which shows a flange 1 separated from the link 200.

The flange 1 has a main plane 81 perpendicular to the direction y of the thickness. The flange 1 features two opposite longitudinal parts: a first part 2 and a second part 4. The first part 2 and the second part 4 are mutually delimited by a transverse plane 83 perpendicular to the longitudinal direction z and to the main plane 81. In the state assembled into a chain 100, the part longitudinally on the head side of the chain 100 is called the head part whilst the other part is called the tail part. As a function of the direction in which the flange 1 is mounted in the chain 100, the first part 2, on the right in FIG. 1, forms the head part whilst the second part 4, on the left in FIG. 1, forms the tail part, or vice versa.

In the example described here, the first part 2 and the second part 4 of the flange 1 are symmetrical with respect to one another relative to the transverse plane 83. The transverse plane 83 constitutes a plane of symmetry of the flange 1. Alternatively, the flange 1 features exceptions to this symmetry relative to the transverse plane 83.

The flange 1 comprises a body 3 in the form of a plate. The body 3 features a first face 31 and an opposite second face 33. The first face 31 and the second face 33 are substantially plane and perpendicular to the thickness direction y. The first face 31 substantially coincides with the main plane 81. The distance between the first face 31 and the second face 33 defines the thickness 93 of the body 3. The thickness 93 is substantially homogeneous in the body 3.

There is now described a longitudinal half of the flange 1 corresponding to the first part 2, to the right of the transverse plane 83 in FIG. 1. The other half corresponding to the second part 4 is deduced from symmetry relative to the transverse plane 83.

The first part 2 of the flange 1 comprises a heel 5 and a base 7. The heel 5 is situated on one side of the flange 1 in the transverse direction x, at the top in FIG. 1, whilst the base 7 is situated on the opposite side, at the bottom in FIG. 1.

Here the heel 5 designates a part of the flange 1 configured to function in compression and bearing against corresponding parts of other links. The heel 5 is formed as a longitudinal extension of the body 3, at the longitudinal end opposite the transverse plane 83, or distal end. The body 3 and the heel 5 are delimited by a common longitudinal edge surface 35, at the top in FIG. 1. Here the longitudinal edge surface is substantially continuous, plane and perpendicular to the transverse direction x. Alternatively, the longitudinal edge surface 35 is slightly convex or slightly concave, for example in order to cooperate with a guide member of corresponding shape during the movement of the chain 100. The longitudinal edge surface 35 connects the first face 31 and the second face 33 to one another and extends over all the length of the flange 1.

At the longitudinal end of the first part 2 the heel 5 is delimited by a front surface 55. The front surface 55 also connects the first face 31 and the second face 33 to one another. Moreover, the front surface 55 and the longitudinal edge surface 35 are substantially perpendicular and connected to one another by a connecting fillet. Here the front surface 55 extends in the transverse direction x over a width less than half the overall width of the flange 1.

The front surface 55 is configured so as to cooperate through corresponding shapes with a corresponding surface of an analogous flange 1. In the assembled and rectilinear state of the chain 100, the front surface $55_n$ of the first part $2_n$ of the flange $1_n$ of the link $200_n$ cooperates with a front surface $55_{n+2}$ of a second part $4_{n+2}$ of a flange $1_{n+2}$ analogous to the flange $1_n$. The front surfaces 55 cooperate by abutting with one another.

Here the front surfaces 55 are substantially continuous, plane and perpendicular to the longitudinal direction z. The respective front surfaces 55 of the first part 2 and of the second part 4 of the flange 1 are then strictly symmetrical with respect to one another relative to the transverse plane 83. Alternatively, the front surfaces 55 of the first part 2 and of the second part 4 have different but substantially corresponding shapes. For example, one is convex and the other one concave. In this case, this constitutes an exception to the symmetrical character of the flange 1. The first part 2 and the second part 4 are substantially symmetrical with respect to one another, apart from the shape of the front surfaces 55.

The heel 5 is delimited in the transverse direction x opposite the longitudinal edge surface 35 by a lateral surface 57 and a connecting portion 80. The lateral surface 57 is substantially plane and perpendicular to the transverse direction x, situated on the side of the longitudinal end of the first part 2 and connected to the front surface 55 by a connecting fillet. The connecting portion 80 is formed as an extension of the lateral surface 57 towards the transverse plane 83. The connecting portion 80 is substantially concave and rounded. The connecting portion 80 extends in part around and at a distance from the base 7. The lateral surface 57 and the connecting portion 80 connect the first face 31 and the second face 33 to one another.

The base 7 has the shape of a portion of a generally circular plate. The base 7 lies substantially in a plane parallel to the body 3 and to the heel 5. The base 7 has a first face 71 and an opposite second face 73. The first face 71 and the second face 73 are substantially plane and perpendicular to the thickness direction y. The first face 71 substantially coincides with the main plane 81. The distance between the first face 71 and the second face 73 defines the thickness 97 of the base 7, which here is substantially homogeneous and equal to the thickness 93 of the body 3 and of the heel 5. The body 3 and the heel 5 on the one hand and the base 7 on the other hand lie on respective opposite sides of the main plane 81 and are parallel to the main plane 81. The thickness 93 of the body 3 and of the heel 5 and the thickness 97 of the base are substantially equal and constant perpendicularly to the main plane 81. The flange 1 has a substantially constant thickness. The overall thickness of the flange 1 is substantially equal to twice the thicknesses 93 and 97, which is the result of the offsetting of the base 7 relative to the body 3 and to the heel 5 in the direction y of the thickness.

A circular hole 75 passes through the base 7 in the thickness direction y. The bore of the hole 75 is substantially cylindrical and connects the first face 71 and the second face 73 to one another. In operation, the base 7 forms a bearing for the rotation about one of the rotation axes 400 of the flange 1 around a rod 91 disposed in the hole 75.

The base 7 is connected to the body 3 and to the heel 5 by means of a connecting portion 9. The connecting portion 9 extends through the main plane 81. The connecting portion 9 has a complex, double-bend shape in which the bends substantially form a right angle in opposite directions relative to one another, substantially of "S" shape. The double bend of the connecting portion 9 is generally rounded so that the first face 31 of the body 3 and of the heel 5 and the second face 73 of the base 7 are connected to one another in a substantially continuous manner. Similarly, the second face 33 of the body 3 and of the heel 5 and the first face 71 of the base 7 are connected to one another in a substantially continuous manner.

The body 3 and the base 7 are delimited in the transverse direction x by a longitudinal edge surface 37 opposite the longitudinal edge surface 35, at the bottom in FIG. 1. Here the longitudinal edge surface 37 is substantially plane and perpendicular to the transverse direction x. Alternatively, the longitudinal edge surface 37 is slightly convex or slightly concave, for example in order to cooperate with a guiding member of corresponding shape during the movement of the chain 100. The longitudinal edge surface 37 extends from one base 7 to its symmetrical counterpart and passes through an intermediate part of the body 3 and the connecting portions 9. Unlike the longitudinal edge surface 35, the longitudinal edge surface 37 is not rectilinear and features offsets in the thickness direction y along the body 3, the connecting portions 9 and the bases 7 as can be seen in FIG. 2, for example. The longitudinal edge surface 37 connects the first face 31 and the second face 33 of the body 3 to one another and the first face 71 and the second face 73 of the base 7 to one another.

At each of its longitudinal ends the longitudinal edge surface 37 is connected in a substantially continuous manner to a transverse edge surface 77. The transverse edge surface 77 has a substantially cylindrical shape partially surrounding the base 7, extending over more than 180° around the hole 75.

The part of the base 7 situated on the side of the transverse plane 83, or proximal part, is partially surrounded by the connecting portion 9 that connects it to the body 3 whilst the part of the base 7 farthest from the transverse plane 83, or distal part, is free and delimited by the transverse edge surface 77. A connecting surface 79 delimits the longitudinal end of the connecting portion 9. The connecting surface 79 extends substantially perpendicularly to the longitudinal direction z. The connecting surface 79 is connected to the connecting portion 80.

To summarize, the contour of the flange 1 is formed successively by:
   the longitudinal edge surface 35 that extends over all the length of the flange 1,
   the front surface 55 of the first part 2,
   the lateral surface 57 of the first part 2,
   the connecting portion 80 of the first part 2,
   the connecting surface 79 of the first part 2,
   the transverse edge surface 77 of the first part 2,
   the longitudinal edge surface 37 that extends from the first part 2 to the second part 4,
   the transverse edge surface 77 of the second part 4,
   the connecting surface 79 of the second part 4,
   the connecting portion 80 of the second part 4,
   the lateral surface 57 of the second part 4,
   the front surface 55 of the second part 4 connected to the longitudinal edge surface 35.

The transverse edge surface 77, the connecting surface 79 and the connecting portion 80 of the first part 2, respectively of the second part 4, together define a space formed between the heel 5 and the base 7. The space is open at one longitudinal end of the flange 1 and extends partially around the base 7, toward the transverse plane 83 and longitudinally beyond the center of the hole 75. Here the space takes the form of a cut-out. In other words, the connecting surface 79 that delimits the connecting portion 9 of the free space is situated at a distance from the transverse plane 83 strictly less than the distance that separates the rotation axis 400 from the transverse plane 83. During the assembly of two flanges 1 around a common rod 91, the connecting surfaces 79 of the flanges 1 do not come into contact and a distance is preserved between them, as is apparent in FIG. 7.

In the example described here, the flange 1 comprises a nipple 11. The nipple 11 projects from the first face 31 of the body 3. The nipple 11 therefore projects on the same side of the main plane 81 as the bases 7. Here the nipple 11 is substantially centered on the first face 31 and extends through the transverse plane 83.

Here the nipple 11 has a rectangular section. The nipple 11 has a lateral surface 15. Here the lateral surface 15 is substantially plane, perpendicular to the transverse direction x and oriented toward the longitudinal edge surface 35, upward in FIG. 1. The position of the nipple 11 relative to the body 3 is selected so that the lateral surface 15 is substantially coplanar with the lateral surface 57 of the heel 5 and oriented in the opposite direction. The lateral surface 15 therefore forms a seat for the lateral surface 57 of each of the two adjacent flanges 1 when the chain 100 adopts a rectilinear position. This abutting cooperation is represented in FIG. 5 for example.

The lateral surface 57 of the heel 5 and the lateral surface 15 of the nipple 11 are configured so as to cooperate through corresponding shapes from one flange 1 to the other. In the assembled and rectilinear state of the chain 100, the lateral surfaces $57_n$ respectively cooperate with the lateral surfaces $15_{n-1}$ and $15_{n+1}$. The lateral surface $15_n$ cooperates with one of the lateral surfaces $57_{n-1}$ and one of the lateral surfaces $57_{n+1}$. When the chain 100 goes from a curved state to a rectilinear state the aforementioned surfaces come to cooperate by abutting so as to stop the relative rotation of the two adjacent flanges 1 when a rectilinear configuration is reached.

The second face 33 includes an imprint or concavity 13 corresponding to the nipple 11. The imprint 13 is the result of the operation of deforming a metal plate to form the nipple 11, here in a press. Alternatively, the imprint 13 is absent, for example if the nipple 11 is produced by addition of material to the first surface 31, for example by welding, or is a part attached by screwing or machine welding.

The rectangular shape of the nipple 11 of the embodiment from FIGS. 3 to 7, in particular the orientation of the lateral surface 15 perpendicular to the direction x, make it possible to prevent the transmission of compression forces oriented in the direction z from one link 200 to the next.

A variant embodiment of the nipple is represented in FIG. 8. The nipple is referenced 611. The nipple 611 has a circular section and is positioned closer to the longitudinal edge surface 35 than the nipple 11 of the embodiment described above. The recessed imprint 613 in the second face 33 is also of circular section. The nipple 611 has a lateral surface 615 of substantially cylindrical shape. In this variant, the lateral surface 657 and the lateral surface 615 have corresponding shapes, that is to say a substantially cylindrical or half-bore concave shape. The lateral surface 657 is formed at the end of the heel 5, that is to say in the front surface 655. The shape of the lateral surface 657 differs from a strictly circular shape in that it is connected to the front surface 655 by a fillet tangential to the circle shape. A fillet of this kind facilitates the placement of the nipple 611 against the lateral surface 657 during folding/unfolding of the portion of the chain 100.

A variant embodiment of the nipple, referenced 711, is represented in FIG. 9. The nipple 711 also has a circular section and is positioned at the same location on the body 3 as the nipple 11 from FIG. 3. The recessed imprint 713 in the second face 33 is also of circular section. The nipple 711 has a latera surface 715 of substantially cylindrical shape. In this variant, the lateral surface 757 also has a corresponding shape, that is to say a quarter-circle cut-out shape. The lateral surface 757 is formed at the corner connecting the front surface 55 and the corresponding longitudinal edge surface to the lateral surface 57 of the FIG. 3 embodiment.

In the examples described here, the lateral surfaces 15, 615, 715, 57, 657 and 757 of each of the first part 2 and the second part 4 of each flange 1 are symmetrical in pairs relative to the transverse plane 83. The symmetry of the flange 1 is strictly conformed to. Alternatively, the lateral surfaces of the first part 2 and the lateral surfaces of the second part 4 have asymmetrical configurations. In this case, this constitutes an exception to the symmetrical character of the flange 1. The first part 2 and the second part 4 are substantially symmetrical with respect to one another, except for the shape of the lateral surfaces 15, 615, 715, 57, 657 and 757.

Reference is now made to FIGS. 4 to 7. In those figures there is represented the assembly of two flanges $1_n$ and $1_{n+1}$ belonging to respective adjacent links of a chain 100.

For the assembly operation, the flanges $1_n$ and $1_{n+1}$ are positioned in similar orientations but opposite ways round in the direction y of the thickness. In other words, the longitudinal flanks $35_n$ and $35_{n+1}$ are aligned, the longitudinal flanks $37_n$ and $37_{n+1}$ are aligned and the first faces $31_n$ and $31_{n+1}$ are oriented in opposite directions. The main planes $81_n$ and $81_{n+1}$ coincide. The body $3_n$ and the heels $5_n$ are aligned with the bases $7_{n+1}$ whilst the body $3_{n+1}$ and the heels $5_{n+1}$ are aligned with the bases $7_n$. To carry out the assembly and to go from the state represented in FIG. 4 to that represented in FIGS. 5, 6 and 7, the flanges $1_n$ and $1_{n+1}$ interpenetrate through a movement toward one another in the common longitudinal direction z. In the final position the hole $75_n$ of the second part $4_n$ is aligned with the hole $75_{n+1}$ of the second part $4_{n+1}$ so that the rod 91 can be threaded therein, defining the rotation axis 400.

For each flange 1, the interpenetrating assembly, with first faces 31 and 71 against first faces 31 and 71, leads to forming a quincunx row. By alternating the directions of the flanges 1 from one link 200 to another, the first parts 2 are superposed with first parts 2 whilst the second parts 4 are superposed with second parts 4 in the transverse direction y. The lateral surfaces 15, 615, 715, 57, 657, 757 of the first parts 2 on the one hand and of the second parts 4 on the other hand may therefore be different and incompatible. In this case, this constitutes an exception to the symmetrical character of the flange 1. The first part 2 and the second part 4 are substantially symmetrical with respect to one another, except for the shape of the lateral surfaces 15, 615, 715, 57, 657 and 757. The front surfaces 55 of the first parts 2 and the front surfaces 55 of the second parts 4 come to bear against one another. They are compatible with one another.

The thickness of the assembly of the flanges $1_n$ and $1_{n+1}$ then corresponds to the overall thickness of a flange 1, that is to say twice the thickness 93 of the body 3.

The assembly of two flanges $1_n$ and $1_{n+1}$ forms an elementary pattern reproduced as many times as necessary to form a chain 100 of the required length.

In FIG. 10, the flange $1_n$ is assembled on one side to the flange $1_{n+1}$, and on the opposite side to a flange $1_{n-1}$. The portion of the chain 100 that goes from a curved configuration as shown in FIGS. 11 and 12 to a rectilinear configuration as shown in FIG. 10 cannot become curved in the opposite direction thanks to the abutting of the corresponding lateral surfaces 15 and 57 of the three flanges 1. The latera surfaces 15, 57 then form abutment surfaces. In FIGS. 10, 11 and 12 the rods 91 forming rotation axes 400 are not shown.

During an operation of deployment of the chain 100, the latter goes progressively from a rolled or at least curved configuration to a rectilinear configuration to function in compression in the longitudinal direction z and to push a mobile element and/or in traction via the rods 91 disposed in the holes 75. During its deployment, the chain 100 is driven by a motor. The portions of the chain 100, the links 200, go one after the other into at least one guiding zone. The guiding zone, for example a set of rails, forces the flanges 1 to turn relative to one another to adopt a rectilinear configuration, for example to go from the state shown in FIGS. 11 and 12 to that shown in FIG. 10.

The flanges 1 are then aligned in two layers that correspond to the double thickness. In other words, a first layer is formed by the end-to-end abutment of the flanges $1_{n-4}$, $1_{n-2}$, $1_n$, $1_{n+2}$, $1_{n+4}$, etc. whilst the second layer is formed by the end-to-end abutment of the flanges $1_{n-3}$, $1_{n-1}$, $1_{n+1}$, $1_{n+3}$, etc. The front surfaces $55_{n-1}$ and $55_{n+1}$ come to bear on one another. The flanges 1 are therefore pushed against one another two by two as deployment proceeds and via their respective front surfaces 55 which then form bearing surfaces. The links of the chain 100 function in compression in the longitudinal direction z. At the scale of the chain 100, the compression forces are divided in two sections perpendicular to the principal direction z of the chain 100 in the rectilinear state, the two sections substantially corresponding to double the area of the front surface 55.

In first applications the chain 100 is designed to operate in a direction inclined relative to the horizontal or to the vertical. In this case, the longitudinal direction z corresponds to this operating direction. For example, the chain 100 is used to convey heavy masses. The weight of the chain 100 is generally too high for the chain 100 to resist bending, unintentional curvature, under its own weight. External supports are then necessary, in particular to operate over large travels. The rectilinear portion of the chain 100 then rests on appropriate structures relative to which they move in translation. In this case, the presence of nipples 11, 611, 711 and the cooperation with the lateral surfaces 57, 657, 757 may be superfluous. Nevertheless, the cooperation between nipples 11, 611, 711 and lateral surfaces 57, 657, 757 improves the retention of a good alignment of the links of the chain 100.

In second applications the chain 100 is designed to operate substantially vertically. In this case the longitudinal direction z corresponds to the vertical direction. For example, the chain 100 is used to lift a platform of a freight elevator. The weight of the platform, of the article that it supports and/or of the chain 100 itself may suffice to maintain a high compression force in the longitudinal direction z in the vertical portion of the chain 100. In this case, the presence of the nipples 11, 611, 711 and the cooperation between the lateral surfaces 15, 57, 615, 657, 715, 757 may be superfluous. Alternatively, guides accompany the movement of the chain 100 along at least a part of its vertical travel so as to prevent the phenomena of buckling or accidental curvature of the chain 100. For example, rails are disposed so as to support by sliding contact the longitudinal edge surface 35 and/or the longitudinal edge surface 37 of the flanges 1. When nipples 11, 611, 711 are provided, their cooperation with the respective lateral surfaces 57, 657, 757 improves the retention of the chain 100 in a rectilinear configuration.

During an operation of stowing the chain 100, the directions of the movements are reversed relative to the deployment operation. The chain 100 can then operate in traction, by means of the bases 7 and the rods 91 that pass through them.

A chain 100 formed by the assembly of flanges 1 one after the other by means of rods 91 disposed in the bearings formed by the bases 7 is functional. Nevertheless, if the travels are long and the loads heavy, a chain 100 of this kind tends to be sensitive to buckling and to bending in the transverse direction y. In particular, the connecting portions 9 of the flanges 1 may be deformed, which may lead to rendering the chain 100 unusable. To limit these risks, the chain 100 may be guided over a great part of its travel to prevent unwanted movements. The chain 100 can equally be duplicated as shown in FIGS. 1 and 2. Each link then comprises two similar flanges 1 connected by rods 91 defining common rotation axes 400 passing through the bases 7. The chain 100 then has a cross section of substantially square rather than flat shape. The strength and the resistance to bending are improved. The chain 100 has two rows of flanges 1, each row being composed of two quincunx layers that interpenetrate. Alternatively, each link may comprise more than two similar flanges interconnected by rods.

In the configuration shown in FIGS. 1 and 2, the pairs of flanges 1 of the same link 200 are mounted symmetrically relative to a plane perpendicular to the transverse direction y. Alternatively, the pairs may be mounted in an asymmetric manner.

In the example described here, the flanges 1 are fabricated from sheet metal plate. The flanges 1 are in one piece. The flanges 1 are free of external fixings of rivet, bolt or nut type and welded or brazed type joints. Alternatively, the flange 1 may be formed in one piece by welding two one-piece parts for example.

The method of manufacture may be broken down into the following steps:
  a) cropping a flange 1 blank in a sheet metal plate,
  b) offsetting the bases 7 relative to the heels 5 in the direction of the thickness and forming the connecting portions 9 connecting the heel 5 to the base 7 by bending, for example double bending or dimpling.

Here the method further comprises the following additional steps:
  c) flattening and rendering parallel the body 3 and the heels 5 on the one hand and the bases 7 on the other hand,
  d) finishing at least some of the functional surfaces, such as those of the heels 5, the nipple 11 and the holes 75.

During the cropping step a) the contour of the flange 1 as defined above is cut. Moreover, the holes 75 are also hollowed out and the nipple 11 is formed. At the end of the cropping stage, the flange 1 blank, or plate, is still substantially plane, in plate form. During the step b), the formation of the connecting portions 9 causes the flange 1 blank to go to its final or quasi-final shape. The thickness of the flange 1 blank goes from the thickness of the starting plate to substantially twice the overall thickness, that is to say the sum of the thickness 93 of the body 3 and the heels 5 and of the thickness 97 of the bases 7.

Alternatively, the flange 1 is manufactured at least in part by machining it from solid. A blank with a thickness substantially equal to the required overall thickness of the flange 1 may undergo successive operations of removal of material to produce the flange 1. The offsetting of the flange 1 may also be obtained by welding or by machine welding of two parts.

Alternatively, the flange 1 is made of a non-metal, for example plastic material. The flange 1 may for example be produced by injection molding.

The invention is not limited to the examples of rigid chain links and rigid chains described above by way of example only but encompasses all variants that the person skilled in the art might envisage within the scope of the following claims.

The invention claimed is:
1. A link of a rigid chain, comprising at least one flange of generally rectangular shape and of substantially constant thickness perpendicular to a main plane of the flange on a surface of the flange, the flange comprising a first part and a second part, each of the parts comprising:
  a heel having a surface configured to bear against a surface of a heel of a flange of an adjacent link of the rigid chain, and a base forming a bearing having a rotation axis of said link and said adjacent link extending perpendicular to the main plane through a central axis of the base, the heel and the base lying on respective opposite sides of the main plane and parallel to said main plane, wherein the heel of the first part and the heel of the second part both lie on one side of the main plane whilst the base of the first part and the base of the second part both lie on the opposite side of the main plane.

2. The link as claimed in claim 1, wherein the base of the first part and the base of the second part are substantially symmetrical with respect to one another relative to a central transverse plane perpendicular to the main plane.

3. The link as claimed in claim 1, wherein the heel of the first part and the heel of the second part are substantially symmetrical with respect to one another relative to a central transverse plane perpendicular to the main plane.

4. The link as claimed in claim 3, wherein the flange is formed in one piece from a sheet metal plate.

5. The link as claimed in claim 3, wherein the heel and the base of the first part and/or the second part each have a face substantially coplanar with the main plane.

6. The link as claimed in claim 1, wherein the flange further comprises a body, the body connecting the heels and the bases to one another.

7. The link as claimed in claim 4, wherein the first part and the second part of the flange each comprise a connecting portion connecting the heel and the base to one another, the connecting portions being formed by bending the sheet metal.

8. The link as claimed in claim 7, wherein a substantially circular hole is formed in the base, a space being formed between the heel and the base, said space being open at one longitudinal end of the flange and extending longitudinally toward the opposite longitudinal end beyond the center of the circular hole.

9. The link as claimed in claim 8, wherein each heel bears a frontal surface oriented so as to come to bear against a frontal surface of said adjacent link.

10. The link as claimed in claim 9, wherein the flange bears lateral surfaces oriented so as to limit the relative rotation of the link and said adjacent link by abutting against lateral surfaces of said adjacent link.

11. The link as claimed in claim 10, wherein the flange further comprises a nipple on the same side of the main plane as the bases, the heels featuring one of said lateral surfaces, the nipple bearing another of said lateral surfaces, so that the lateral surface of the heel comes to abut against the corresponding lateral surface of the nipple of said adjacent link and the lateral surface of the nipple comes to abut against the corresponding lateral surface of the heel of said adjacent link.

12. A rigid chain formed by assembling links as claimed in claim 11, wherein the orientation of the flange of one link is reversed in a thickness direction relative to that of the respective flange of the preceding link and the following link, each link being mounted in rotation with the preceding link and with the following link respectively by means of rods threaded into the bases.

13. A method of manufacturing a link according to claim 12, further comprising the following steps:

cropping a flange blank in sheet metal, and offsetting the bases relative to the heels in the direction of the thickness and forming connecting portions connecting a heel and a base by bending.

14. A link of a rigid chain, comprising at least one flange of generally rectangular shape and of substantially constant thickness perpendicular to a main plane of the flange on a surface of the flange, the flange comprising a first part and a second part, each of the parts comprising:

a heel having a surface configured to come to bear against a surface of a heel of a flange of an adjacent link of the rigid chain, and a base forming a bearing having a rotation axis of said link and said adjacent link extending perpendicular to the main plane through a central axis of the base, the heel and the base lying on respective opposite sides of the main plane and parallel to said main plane, wherein the base of the first part and the base of the second part are substantially symmetrical with respect to one another relative to a central transverse plane perpendicular to the main plane.

15. A link of a rigid chain, comprising at least one flange of generally rectangular shape and of substantially constant thickness perpendicular to a main plane of the flange on a surface of the flange, the flange comprising a first part and a second part, each of the parts comprising:

a heel having a surface configured to come to bear against a surface of a heel of a flange of an adjacent link of the rigid chain, and a base forming a bearing having a rotation axis of said link and said adjacent link extending perpendicular to the main plane through a central axis of the base, the heel and the base lying on respective opposite sides of the main plane and parallel to said main plane, wherein the flange bears lateral surfaces oriented so as to limit the relative rotation of the link and said adjacent link by abutting against lateral surfaces of said adjacent link, and wherein the flange further comprises a nipple on the same side of the main plane as the bases, the heels featuring one of said lateral surfaces, the nipple bearing another of said lateral surfaces, so that the lateral surface of the heel comes to abut against the corresponding lateral surface of the nipple of said adjacent link and the lateral surface of the nipple comes to abut against the corresponding lateral surface of the heel of said adjacent link.

16. A rigid chain formed by assembling links as claimed in claim 15, wherein the orientation of the flange of one link is reversed in a thickness direction relative to that of the respective flange of the preceding link and the following link, each link being mounted in rotation with the preceding link and with the following link respectively by means of rods threaded into the bases.

17. A method of manufacturing a link according to claim 16, further comprising the following steps:

cropping a flange blank in sheet metal, and offsetting the bases relative to the heels in the direction of the thickness and forming connecting portions connecting a heel and a base by bending.

* * * * *